United States Patent
Suzuki et al.

(10) Patent No.: US 9,223,641 B2
(45) Date of Patent: Dec. 29, 2015

(54) MULTICORE PROCESSOR SYSTEM, COMMUNICATION CONTROL METHOD, AND COMMUNICATION COMPUTER PRODUCT

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 13/729,854

(22) Filed: Dec. 28, 2012

(65) Prior Publication Data

US 2013/0117765 A1     May 9, 2013

Related U.S. Application Data

(63) Continuation of application No. PCT/JP2010/061080, filed on Jun. 29, 2010.

(51) Int. Cl.
*G06F 9/54* (2006.01)
*G06F 9/48* (2006.01)

(52) U.S. Cl.
CPC .............. *G06F 9/542* (2013.01); *G06F 9/4843* (2013.01); *G06F 9/54* (2013.01)

(58) Field of Classification Search
CPC .......... G06F 9/542; G06F 9/4843; G06F 9/54
See application file for complete search history.

(56) References Cited

U.S. PATENT DOCUMENTS

| | | | |
|---|---|---|---|
| 5,715,457 A | 2/1998 | Wakatani | |
| 5,913,059 A * | 6/1999 | Torii | 718/104 |
| 6,275,987 B1 * | 8/2001 | Fraley et al. | 717/127 |
| 6,292,820 B1 * | 9/2001 | Korn | 718/100 |
| 6,581,089 B1 | 6/2003 | Imamura | |
| 6,748,444 B1 | 6/2004 | Nagashima | |
| 8,209,690 B2 * | 6/2012 | Wen et al. | G06F 9/4843 712/30 |
| 2002/0147760 A1 * | 10/2002 | Torii | G06F 8/45 718/107 |
| 2008/0104610 A1 * | 5/2008 | Norton et al. | 718/108 |
| 2009/0037927 A1 * | 2/2009 | Sangili et al. | 718/108 |
| 2009/0089792 A1 * | 4/2009 | Johnson et al. | 718/105 |
| 2009/0165016 A1 * | 6/2009 | Bell et al. | 718/107 |

(Continued)

FOREIGN PATENT DOCUMENTS

| | | |
|---|---|---|
| JP | 09-160890 A | 6/1997 |
| JP | 11-024944 A | 1/1999 |

(Continued)

OTHER PUBLICATIONS

International Search Report.

*Primary Examiner* — Charles E Anya
(74) *Attorney, Agent, or Firm* — Arent Fox LLP

(57) ABSTRACT

A multicore processor system is configured to cause among multiple cores, a second core to acquire from a first core that executes a first process, an execution request for a second process and a remaining period from a time of execution of the execution request until an estimated time of completion of the first process; and give notification of a result of the second process from the second core to the first core after an estimated completion time of the first process obtained by adding the remaining period to a start time of the second process.

7 Claims, 13 Drawing Sheets

(56) References Cited

U.S. PATENT DOCUMENTS

| | | | |
|---|---|---|---|
| 2011/0126200 A1* | 5/2011 | Krieger et al. | 718/102 |
| 2011/0126209 A1* | 5/2011 | Housty | 718/105 |
| 2011/0145838 A1* | 6/2011 | de Melo et al. | G06F 11/3466 719/318 |
| 2011/0209153 A1* | 8/2011 | Suzuki et al. | 718/102 |
| 2011/0302589 A1* | 12/2011 | Aussagues et al. | 718/104 |
| 2011/0310977 A1* | 12/2011 | Nishihara et al. | 375/240.24 |

FOREIGN PATENT DOCUMENTS

| | | |
|---|---|---|
| JP | 11-306038 A | 11/1999 |
| JP | 2001-156842 A | 6/2001 |

\* cited by examiner

FIG.6

| PARENT PROCESS | ESTIMATED PERIOD (A) FOR COMPLETING PARENT PROCESS | CHILD PROCESS | ESTIMATED PERIOD (B) FOR PROCESS THAT USES CHILD PROCESS RESULT |
|---|---|---|---|
| parse_html() | 20 msec | decode_jpeg() | 2 msec |
| | | decode_png() | 2 msec |

201

MULTICORE PROCESSOR SYSTEM, COMMUNICATION CONTROL METHOD, AND COMMUNICATION COMPUTER PRODUCT

CROSS REFERENCE TO RELATED APPLICATIONS

This application is a continuation application of International Application PCT/JP2010/061080, filed on Jun. 29, 2010 and designating the U.S., the entire contents of which are incorporated herein by reference.

FIELD

The embodiments discussed herein are related to a multicore processor system, a communication control method, and a computer product that control communication among cores.

BACKGROUND

In one conventional form of parallel processing in a multicore processor, one process is defined as a parent process such that a core executing the parent process causes another core to asynchronously execute a child process. The core executing the child process notifies the core executing the parent process of a result of the child process when completing the process, and the core executing the parent process uses the result to continue the process. Since the communication between parent and child is limited to the timing of activation and termination of the child, such a form of parallel processing is suitable for a multicore processor system having no coherency mechanism for caches between cores and a sparsely-connected multicore processor such as that without a shared memory.

When one core executes only one parent process at a time while the other cores execute only child processes instructed from the parent process, the other cores can be controlled from the parent process. This operation is suitable for implementing the parallel processing in an asymmetric multicore processor that is a multicore processor with processors having different capacities and a multicore processor system not equipped with an OS compatible with multicore processors. Particularly, in the field of embedded devices, since multiple processes executing parallel processing are still rarely activated at the same time and can be implemented with simple hardware, this form of parallel processing requiring no OS compatible with multicore processors is extremely suitable.

A multicore processor can efficiently be operated by predicting an estimated time for completing a process and utilizing the estimated time in a method of controlling the other cores described above. For example, a technique is disclosed that collects predicted times of termination for all the tasks from other cores so as to determine a core to which a process is allocated based on the collected predicted times (see. e.g., Japanese Laid-Open Patent Publication No. H9-160890).

In another technique utilizing an estimated time, for example, a delay of hardware or software is predicted in a system requiring a real-time property and a timer is set in consideration of the predicted delay time. A technique is disclosed that enables packet transmission within a processing request time by transmitting a packet when an interrupt is generated by the timer taking the delay time in consideration (see. e.g., Japanese Laid-Open Patent Publication No. 2001-156842).

However, in the conventional techniques described above, a core completing a child process notifies a core executing a parent process of the completion of the child process or the result of the child process through inter-core communication. The notified core executing the parent process interrupts the parent process to execute a process corresponding to an interrupt, a reception process for the notification, and a process to return to the parent process, etc. Consequently, a problem of an overhead generated by the interruption and restart of processing arises. Since a given process intervenes during another process, the contents of a cache memory are rewritten and changed to contents of given process and the cache hit rate decreases at the time of return to the parent process, resulting in a problem of reduced processing efficiency.

If the number of cores increases and more child processes are executed, the problems described above become more prominent when the frequency of communication increases in proportion to the number of the child processes. As the number of child processes increases, the parent process is frequently blocked by communication from the child processes, resulting in a problem reduced processing efficiency of the core executing the parent process.

SUMMARY

According to an aspect of an embodiment, a multicore processor system is configured to cause among multiple cores, a second core to acquire from a first core that executes a first process, an execution request for a second process and a remaining period from a time of execution of the execution request until an estimated time of completion of the first process; and give notification of a result of the second process from the second core to the first core after an estimated completion time of the first process obtained by adding the remaining period to a start time of the second process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory view of an example of storage contents of a profile table 201;

DESCRIPTION OF EMBODIMENTS

Preferred embodiments of a multicore processor system, a communication control method, and a communication control program will be explained in detail with reference to the accompanying drawings.

Figure 1:
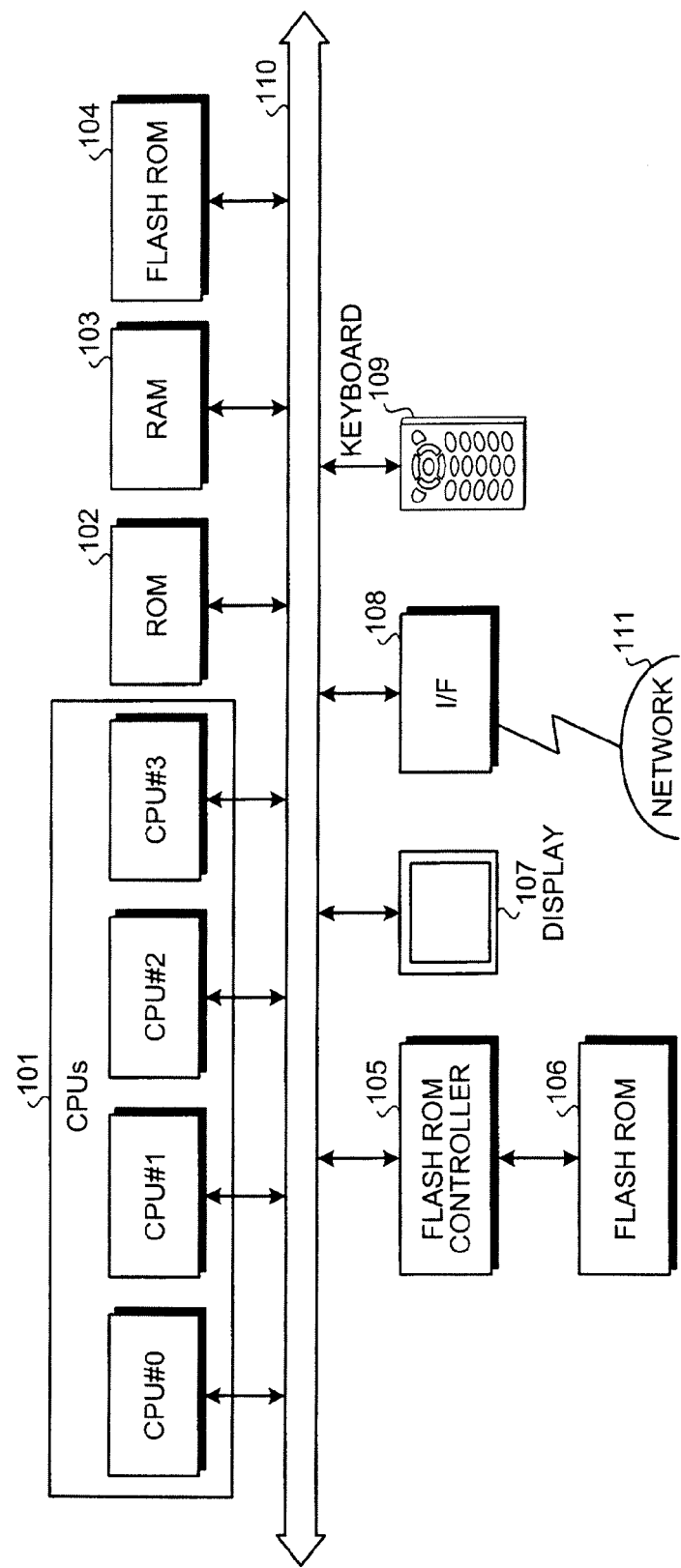
FIG. 1 is a block diagram of a hardware configuration of a multicore processor system according to a first and a second embodiment.

FIG. 1 is a block diagram of a hardware configuration of a multicore processor system according to a first and a second embodiment. As depicted in FIG. 1, a multicore processor system 100 includes multiple central processing units (CPUs) 101, read-only memory (ROM) 102, random access memory (RAM) 103, flash ROM 104, a flash ROM controller 105, and flash ROM 106. The multicore process system 100 includes a display 107, an interface (I/F) 108, and a keyboard 109, as input/output devices for the user and other devices. The components of the multicore system 100 are respectively connected by a bus 110.

The CPUs 101 govern overall control of the multicore processor system 100. The CPUs 101 refer to CPUs that are single core processors connected in parallel. The CPUs 101 include CPUs #0 to #3 respectively having dedicated cache memory. Further, the multicore processor system 100 is a system of computers that include processors equipped with multiple cores. Provided that multiple cores are provided, implementation may be by a single processor equipped with multiple cores or a group of single-core processors in parallel. In the present embodiments, description will be given taking an example where the CPUs are single-core processors connected in parallel.

The ROM 102 stores therein programs such as a boot program. The RAM 103 is used as a work area of the CPUs 101. The flash ROM 104 stores system software such as an operating system (OS), and application software. For example, when the OS is updated, the multicore processor system 100 receives a new OS via the I/F 108 and updates the old OS that is stored in the flash ROM 104, with the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data received by the user of the multicore processor system 100 through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
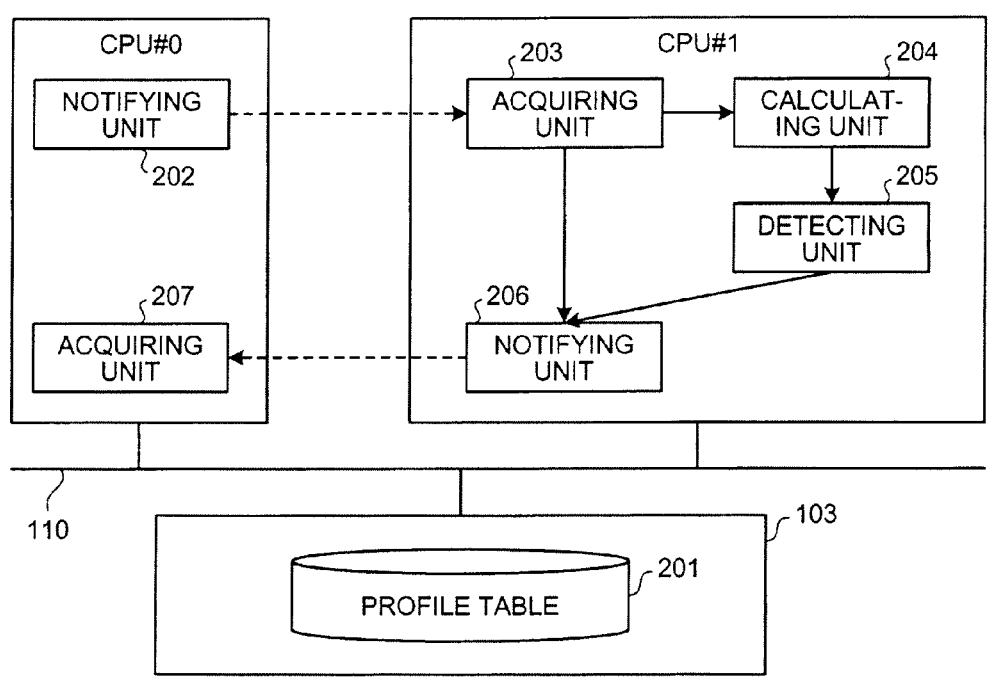
FIG. 2 is a functional diagram of a multicore processor system 100 according to the first embodiment.

Function of the multicore processor system 100 according to the first embodiment will be described. FIG. 2 is a functional diagram of the multicore processor system 100 according to the first embodiment. The multicore processor system 100 includes a notifying unit 202, an acquiring unit 203, a calculating unit 204, a detecting unit 205, a notifying unit 206, and an acquiring unit 207. The functions (the notifying unit 202 to the acquiring unit 207) acting as a control unit are implemented by the CPUs #0 and #1 executing programs stored in storage devices. The storage devices are, for example, the ROM 102, the RAM 103, the flash ROM 104, and the flash ROM 106 depicted in FIG. 1. Alternatively, programs may be executed via the I/F 108 by another CPU to implement the functions.

In FIG. 2, the notifying unit 202 and the acquiring unit 207 are included as functions of the CPU #0 and the acquiring unit 203 to the notifying unit 206 are included as functions of the CPU #1. The CPU #0 is assumed to execute a given process defined as a parent process while the CPU #1 executes a child process called from the parent process. Therefore, if the CPU #1 executes the parent process and the CPU #0 executes the child process, the notifying unit 202 and the acquiring unit 207 may be included as functions of the CPU #1 and the acquiring unit 203 to the notifying unit 206 may be included as functions of the CPU #0.

A process in this embodiment may be a thread itself that is an executable unit of a program, may be one function in a thread, or may be a portion of a function. In the case of a portion of a function, for example, a process may refer to a code portion repeated until a given condition is satisfied.

The multicore processor system 100 can access a profile table 201 stored in the RAM 103 etc. The profile table 201 stores an estimated time for completing a process acquired by profiling, etc. Details of the profile table 201 will be described hereinafter with reference to FIG. 6.

The notifying unit 202 has a function of causing among multiple cores, a first core executing a first process to notify a second core of an execution request for a second process and a remaining period from the time of execution of the execution request to the estimated time of completion of the first process. For example, the first process is a parent process and the second process is a child process. The notifying unit 202 causes the CPU #0 executing the parent process to notify the CPU #1 of an execution request for the child process and a remaining period A1 from the time of the execution request until the completion of the parent process. The contents of the notification may be stored in a register, a cache memory, etc., of the CPU #0.

The acquiring unit 203 has a function of causing the second core different from the first core to acquire from the first core, the execution request for the second process and the remaining period from the time of execution of the execution request until the estimated time of completion of the first process. For example, the acquiring unit 203 causes the CPU #1 to acquire from the CPU #0, an execution request for the child process and the remaining period A1 from the time of the execution request until the completion of the parent process. The acquired contents are stored in a register, a cache memory, etc., of the CPU #1.

The calculating unit 204 has a function of calculating a waiting period by subtracting the period consumed for completing the second process from the remaining period, if the second core completes the second process before the estimated time of completion of the first process. For example, if the CPU #1 completes the child process before the estimated time of completion of the parent process, the calculating unit 204 calculates a waiting period (A1−C1) by subtracting a period C1 consumed for completing the child process from the remaining period A1. The calculated value is stored in a register, cache memory, etc., of the CPU #1.

The detecting unit 205 has a function of causing the second core to detect that a waiting period calculated by the calculating unit 204 has elapsed since the time at the point of calculation by the calculating unit 204. For example, the detecting unit 205 causes the CPU #1 to detect that the waiting period (A1−C1) has elapsed since the calculation of the waiting period of the CPU #1. The method of detection may utilize a timer that is a function of the OS or a counter that counts the clock pulses of the CPU #1 etc. This embodiment utilizes a timer that is a function of the OS, sets a calculated waiting period in the timer and detects the elapse of the waiting period by the expiration of the timer. Information indicative of the detection is stored in the register, the cache memory, etc., of the CPU #1.

The notifying unit 206 has a function of giving notification of a result of the second process from the second core to the first core after an estimated completion time of the first process, obtained by adding the remaining period to the start time of the second process obtained by the acquiring unit 203. When the detecting unit 205 detects that the waiting period has elapsed, the notifying unit 206 may give notification from the second core to the first core. For example, the notifying unit 206 causes the CPU #1 to notify the CPU #0 of the result of the child process after the estimated completion time of the first process, obtained by adding the remaining period A1 to the time of start of the child process. The contents of the notification may be stored in the register, the cache memory, etc. of the CPU #1.

The acquiring unit 207 has a function of acquiring a result reported by the notifying unit 206. For example, the acquiring unit 207 causes the CPU #0 to acquire a result of the child process, reported by the CPU #1. The acquired contents are stored in a register, cache memory, etc. of the CPU #0.

Figure 3:
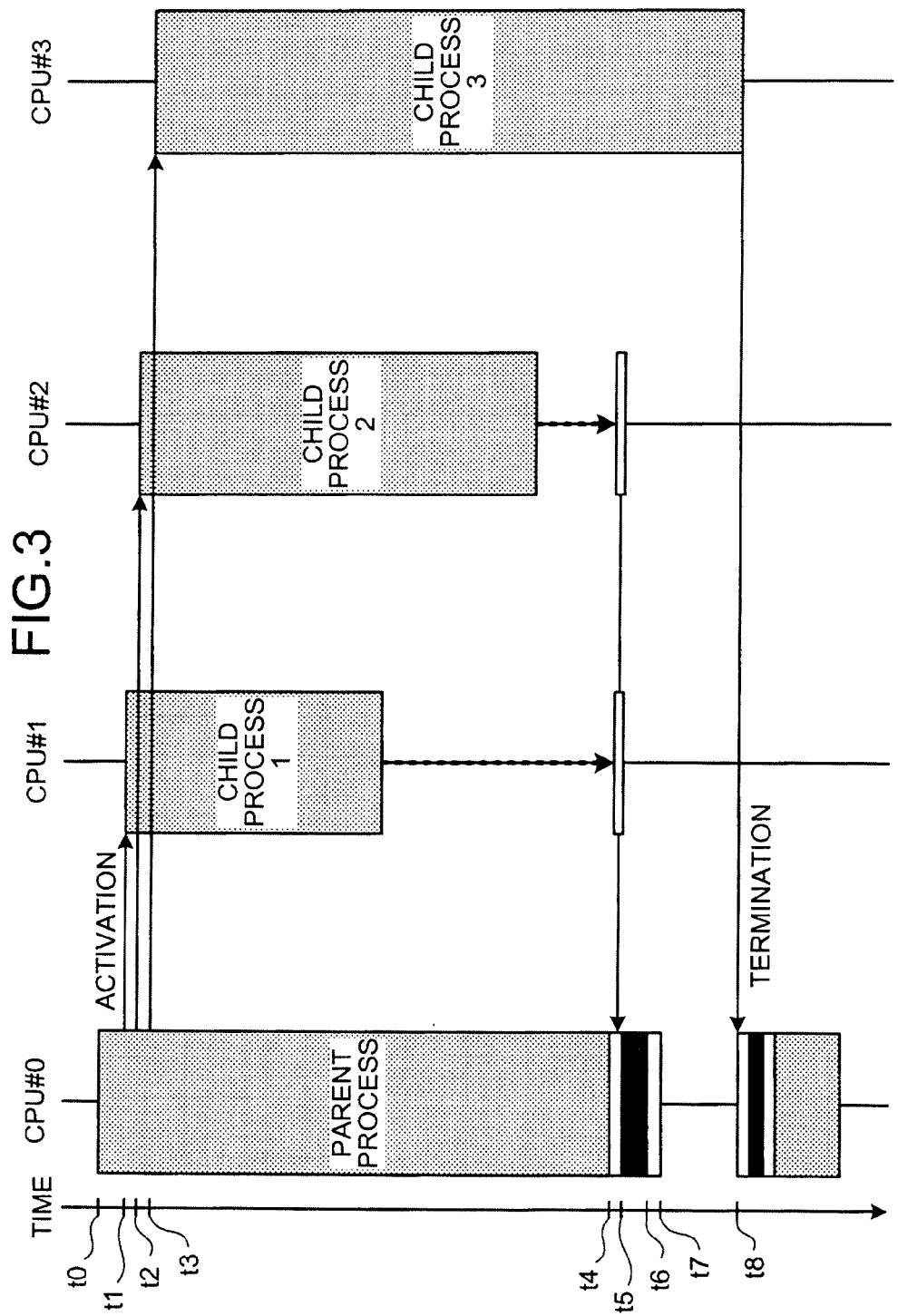
FIG. 3 is an explanatory view of an operation pattern of a process between a parent and child, according to the first embodiment.

FIG. 3 is an explanatory view of an operation pattern of a process between a parent and child, capable of efficiently utilizing cache memory according to the first embodiment. In the example depicted in FIG. 3, the CPU #0 executes a parent process at time t0 and the CPUs #1 to #3 execute child processes 1 to 3 in response to execution requests from the parent process. For example, the CPU #1 executes the child process 1 at time t1; the CPU #2 executes the child process 2 at time t2; and the CPU #3 executes the child process 3 at time t3.

In FIG. 3, it is assumed that the CPU #1 and the CPU #2 complete the processes before time t4 when the parent process starts waiting. The CPU #1 and the CPU #2 wait until time t4 when the parent process starts waiting, and notify the CPU #0 of the results of the child process 1 and the child process 2 at time t4. The notified CPU #0 executes interrupt processes with respect to the CPU #1 and the CPU #2 together from time t4 to time t5, executes reception processes from time t5 to time t6 to receive the results of the child process 1 and the child process 2, and executes a return process from time t6 to time t7. Since the point of time t8 when the child process 3 is completed is after time t4, the CPU #3 executing the child process 3 notifies the CPU#0 of the result of the child process 3 without waiting.

As described, if the child process is completed while the CPU #0 is executing the parent process between time t0 and time t4, the CPU executing the child process waits because the parent process is still under execution, whereby the contents of the cache memory saving the state of the parent process under execution by the CPU #0 can be prevented from being rewritten by an interrupt process and the results of a child process. Since the interrupt processes are executed together at the end of the parent process, the number of interrupts can be reduced.

Figure 4:
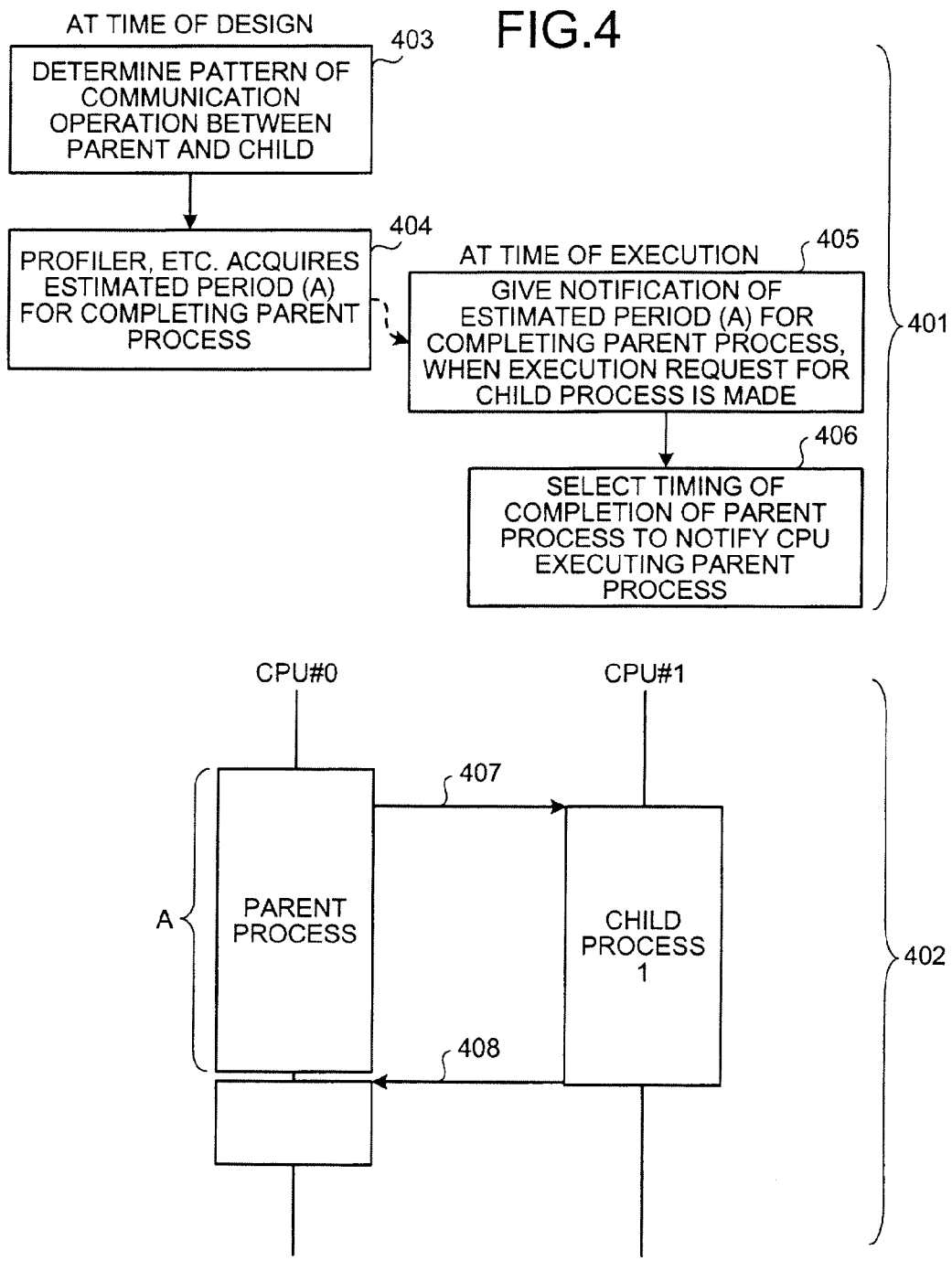
FIG. 4 is an explanatory view of processes executed at the time of design and at the time of execution for controlling the timing of inter-core communication according to the first embodiment.

FIG. 4 is an explanatory view of processes executed at the time of design and at the time of execution for controlling the timing of inter-core communication according to the first embodiment. FIG. 4 depicts processes at the time of design and processes at the time of execution required for implementing the operation depicted in FIG. 3. A process group denoted by reference numeral 401 represents processes 403 to 406 executed at the time of design and execution, and an explanatory view denoted by reference numeral 402 depicts details of the processes corresponding to the processes 403 to 406. The processes executed at the time of design include the process 403 and the process 404 and the processes executed at the time of execution include the process 405 and the process 406.

In the process 403, a profiler or a designer determines the pattern of communication operation between the parent and child. For example, if a given process calls a process, the profiler regards the former process as a parent process and the latter process as a child process. In the explanatory view denoted by reference numeral 402, a process executed by the CPU #0 is regarded as the parent process and a process executed by the CPU #1 is regarded as the child process. In the process 404, the profiler acquires an estimated period (A) for completing the parent process, based on a result of operation in a simulation, etc.

At the time of execution, in the process 405, when the CPU executing the parent process makes an execution request for a child process, the CPU executing the child process is notified of the estimated period (A) for completing the parent process. In the explanatory view denoted by reference numeral 402, the CPU #0 notifies the CPU #1 of the execution request for the child process 1 and the estimated period (A) for completing the parent process through a notification 407. Subsequently, in the process 406, the CPU executing the child process selects the timing of the completion of the parent process to notify the CPU executing the parent process of a result of the child process. In the explanatory view denoted by reference numeral 402, the CPU #1 notifies the CPU #0 of a result of the child process 1 through a notification 408.

Figure 5:
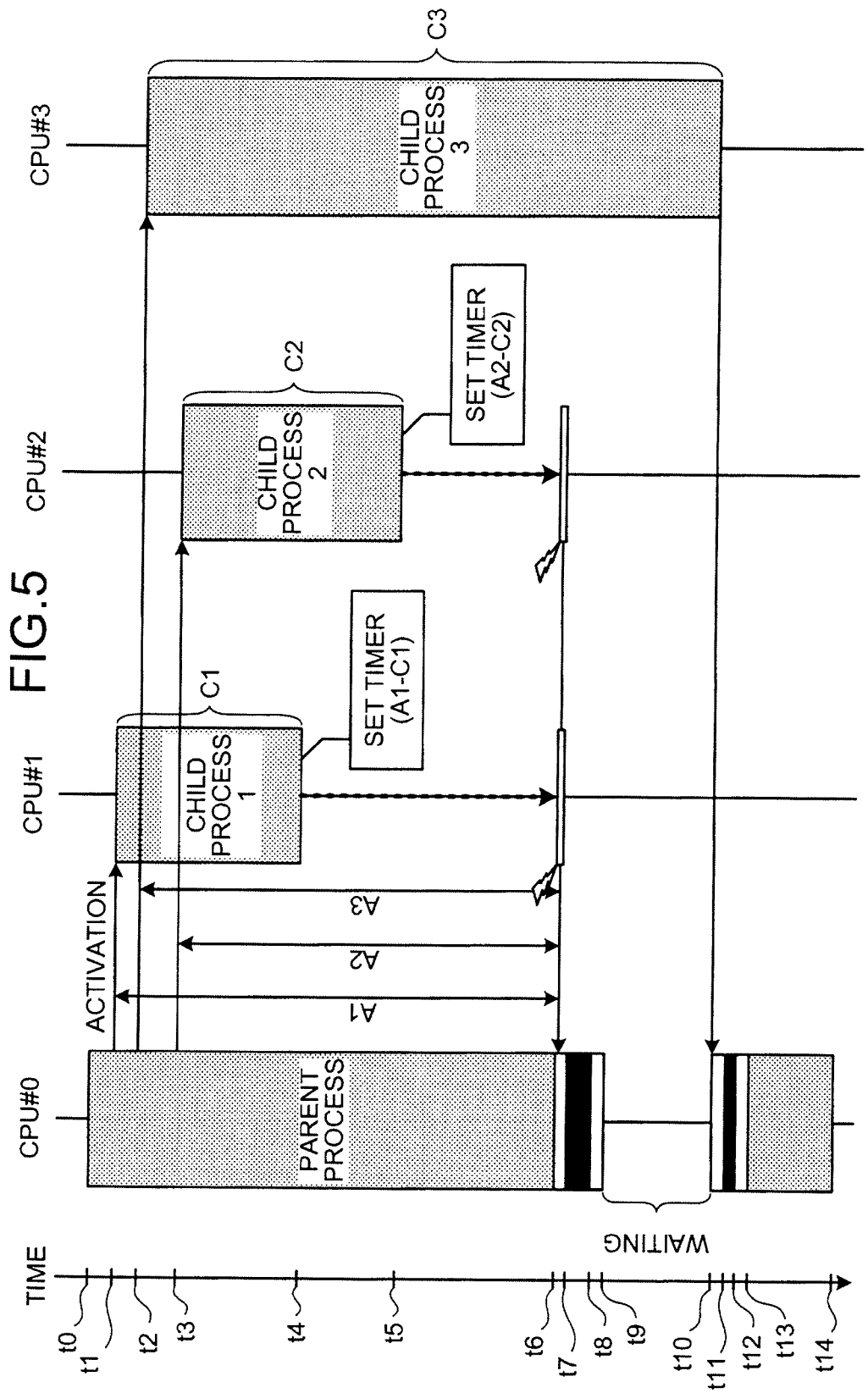
FIG. 5 is an explanatory view of an execution example of a process between a parent and child when the timing of the inter-core communication is controlled according to the first embodiment.

FIG. 5 is an explanatory view of an execution example of a process between the parent and child when the timing of the inter-core communication is controlled according to the first embodiment. FIG. 5 depicts an execution example of a process between the parent and child when the timing of the inter-core communication is controlled by executing the processes at the time of design in FIG. 4. At time t0, the CPU #0 activates the parent process and at time t1, the CPU #0 notifies the CPU #1 of an execution request for the child process 1 and the remaining period A1 from time t1 until time t6 when the parent process is estimated to be completed. Subsequently, at time t2, the CPU #0 notifies the CPU #3 of an execution request for the child process 3 to the CPU #3 and the remaining period A3 from time t2 until the time t6 when the parent process is estimated to be completed. Subsequently, at time t3, the CPU #0 notifies the CPU #2 of an execution request for the child process 2 to the CPU #2 and the remaining period A2 from time t3 until the time t6 when the parent process is estimated to be completed.

The CPU #1 acquires the notification at time t1 and executes the child process 1. The CPU #2 executes the child process 2 at time t3 and the CPU #3 executes the child process 3 at time t2. At time t4, the CPU #1 completes the child process 1. Since at time t4, the remaining period A1 is greater than a period C1 (period consumed for the child process 1) and the CPU #0 has not yet completed the parent process, the CPU #1 calculates the waiting period A1−C1 by subtracting C1 from A1 and sets the waiting period A1−C1 in a timer. After the setting, the CPU #1 sets a thread executing the child process 1 in a sleep state until the timer expires.

Similarly, at time t5, the CPU #2 completes the child process 2. Since at time t5, the remaining period A2 is greater than a period C2 (period consumed for the child process 2) and the CPU #0 has not yet completed the parent process, the CPU #2 calculates a waiting period A2−C2 by subtracting C2 from A2 and sets the waiting period A2−C2 in a timer. After the setting, the CPU #2 sets a relevant thread in the sleep state until the timer expires.

When the timers of the CPUs #1 and #2 expire at time 6, the CPUs #1 and #2 reactivate the threads from the sleep state and notify the CPU #0 executing the parent process of a result of the child process 1 and a result of the child process 2, respectively. The CPU #0 executes interrupt processes with respect to the CPU #1 and the CPU #2 together from time t6 to time t7, executes reception processes from time t7 to time t8 to receive the results of the child process 1 and the child process 2, and executes a return process from time t8 to time t9. After time t9, the CPU #0 executes no particular process and therefore enters a waiting state.

At time t10, the CPU #3 completes the child process 3. Since at time t10, the remaining period A3 is less than or equal to a period C3 (period consumed for the child process 3) and the CPU #0 has completed the parent process, the CPU #3 immediately notifies the CPU #0 of a result of the child process 3. The notified CPU #0 executes an interrupt process with respect to the CPU #3 from time t10 to time t11, executes a reception process from time t11 to time t12 to receive the result of the child process 3, and executes a return process from time t12 to time t13. The CPU #0 receiving the notifications from the CPUs #1 to #3 executes from time t13 to time t14, a process that uses the results of the child processes 1 to 3.

FIG. 6 is an explanatory view of an example of storage contents of the profile table 201. The profile table 201 has four fields including a parent process name, estimated period (A) for completing a parent process, a child process name, and an estimated period (B) for a process that uses a child process result.

The field of parent process name stores a function name of a parent process, or an address storing actual code of the function. The field of estimated period for completing a parent process stores an estimated period for completing a parent process measured by a profiler, etc. The field of child process name stores a child process corresponding to the parent process stored in the field of parent process name. The field of estimated period (B) for a process that uses a child process result stores an estimated period for completing a process that uses a child process result measured by a profiler, etc. The estimated period for a process that uses a child process result is used in the multicore processor system 100 in the second embodiment described hereinafter.

For example, it is assumed that the parent process is a function "parse_html( )" analyzing Hyper Text Markup Language (HTML) documents as a portion of processes of a web browser that is software executed by the multicore processor system 100. The web browser is executed in a simulation to measure the period consumed for "parse_html( )" with a profiler, etc. In the example of FIG. 6, since 20 [msec] is obtained, a designer, etc. stores 20 [msec] as the estimated period (A) for completing a parent process.

If an image is present in an HTML document, the "parse_html( )" function calls a corresponding function as a child process. For example, if a Joint Photographic Experts Group (JPEG) image is present, the "parse_html( )" function calls a "decode_jpeg( )" function as a child process. If a Portable Network Graphics (PNG) image is present, the "parse_html( )" function calls a "decode_png( )" function as a child process. The functions called from the parent process in this way are registered in the field of child process name.

After completion, the "decode_jpeg( )" function and the "decode_png( )" function defined as the child processes notify the "parse_html( )" function defined as the parent process, of a storage address of the image and a size of the image, for example. The notified "parse_html( )" function executes a process of incorporating the storage address of the image and the size of the image into the analysis result of the HTML document. If this incorporating process consumes 2 [msec] at the time of the simulation, the designer, etc. stores 2 [msec] as the estimated period (B) for a process that uses a child process result.

Figure 7:
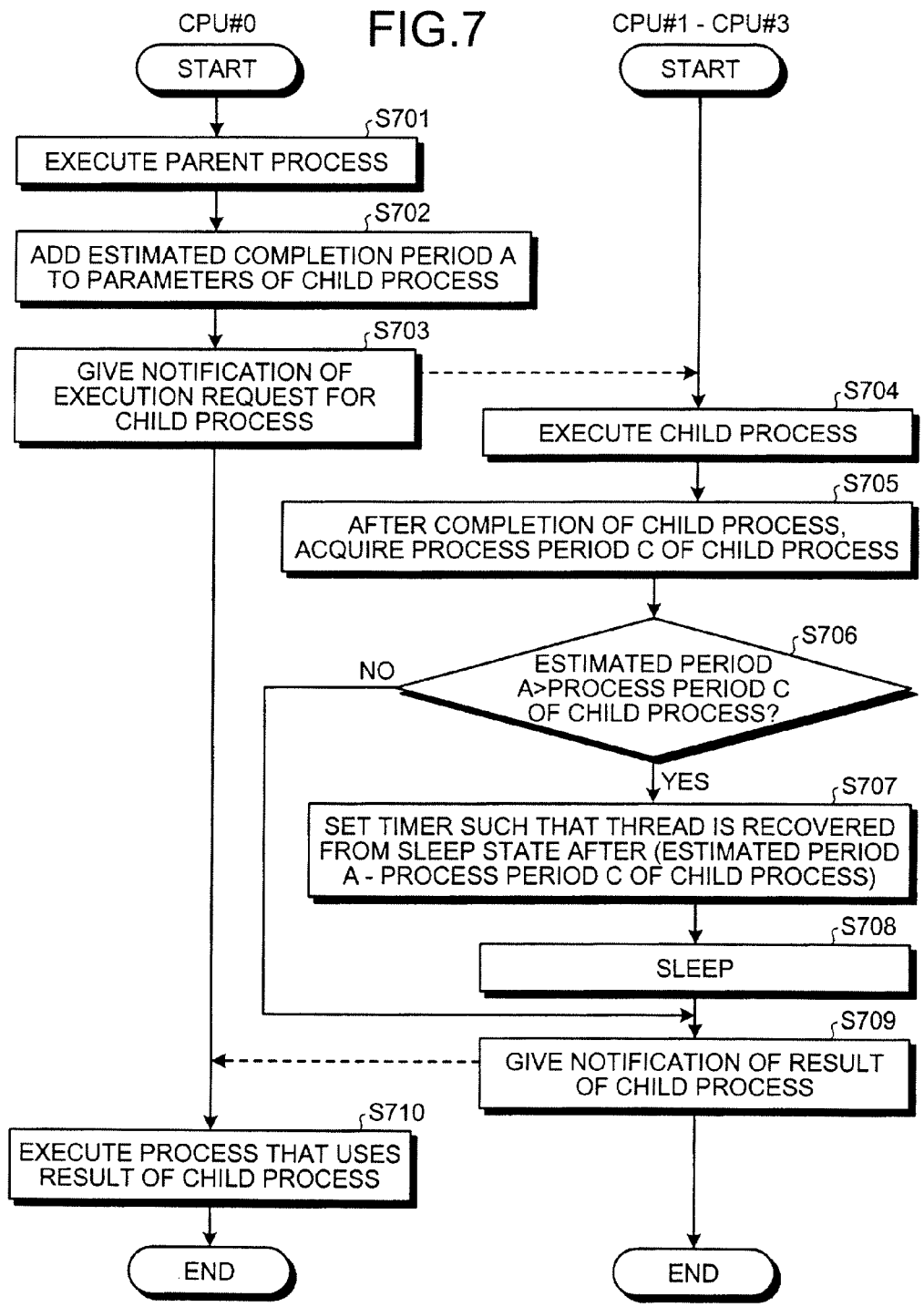
FIG. 7 is a flowchart of a process between a parent and child when the timing of inter-core communication is controlled according to the first embodiment.

FIG. 7 is a flowchart of a process between a parent and child when the timing of inter-core communication is controlled according to the first embodiment. In the process depicted in FIG. 7, the CPU #0 executes a parent process and the CPUs #1 to #3 execute child processes. For simplicity of description, it is assumed that the CPU #1 executes a child process in this description.

The CPU #0 executes the parent process (step S701). When a process calling a child process occurs during the execution of the parent process, the CPU #0 adds an estimated completion period A of the parent process to the parameters of the child process (step S702). After the addition, the CPU #0 notifies the CPU #1 of an execution request for the child process (step S703).

The CPU #1 acquires the execution request for the child process and executes the child process (step S704). After the completion of the child process, the CPU #1 acquires a process period C (period consumed to complete the child process) (step S705). After the acquisition, the CPU #1 determines whether the estimated period A added to the parameters is greater than the process period C of the child process (step S706).

If the estimated period A is greater than the process period C of the child process (step S706: YES), the CPU #1 sets the timer such that the thread is recovered from the sleep state after (the estimated period A−the process period C of the child process) (step S707) and sets the thread in the sleep state (step S708). After recovery from the sleep state consequent to the process at step S708 or if the estimated period A is less than or equal to the process period C of the child process (step S706: NO), the CPU #1 notifies the CPU #0 of the result of the child process (step S709) and is terminated. The notified CPU #0 executes a process that uses the result of the child process (step S710) and completes the process.

As described, according to the multicore processor system, the communication control method, and the communication control program, a second core acquires an estimated period for completing a first process by a first core and an execution request for a second process; and notifies the core of the result of the second process after the estimated period has elapsed. As a result, since the result of the second process is not received while the first core is executing the first process and the contents of the cache memory of the first core are not rewritten and changed to contents of another process, processing efficiency can be improved in the multicore processor system.

If the second core completes the second process before the estimated time of completion of the first process in the multicore processor system, the given core may be notified of the result of the second process when it is detected that the estimated time of completion of the first process has passed. As a result, the contents of the cache memory of the first core are not rewritten and changed to contents of another process and processing efficiency can be improved in the multicore processor system.

If multiple second cores complete the second processes before the estimated period for competing the first process, notification of the results of the second processes are made concurrently after the estimated period for completing the first process has elapsed. Therefore, since the first core can execute together the interrupt processes and the reception processes to receive the results of the second processes, the number of times that the interrupt process is executed is reduced and processing efficiency can be improved.

In the first embodiment, it is not necessary to prepare an estimated period for the second process. Therefore, the accuracy of the estimated period for completing the first process can be improved by allocating a process with a relatively predictable processing period as the first process. A process with a relatively predictable processing period is, for example, a process having a small number of conditional branches.

In the first embodiment, although the parent process is not interrupted by the result of a child process, the process that uses the result of a child process may be interrupted by the result of another child process. The multicore processor system 100 according to the second embodiment provides a configuration in which the result of another child process does not interrupt the process that uses the result of a child process.

Figure 8:
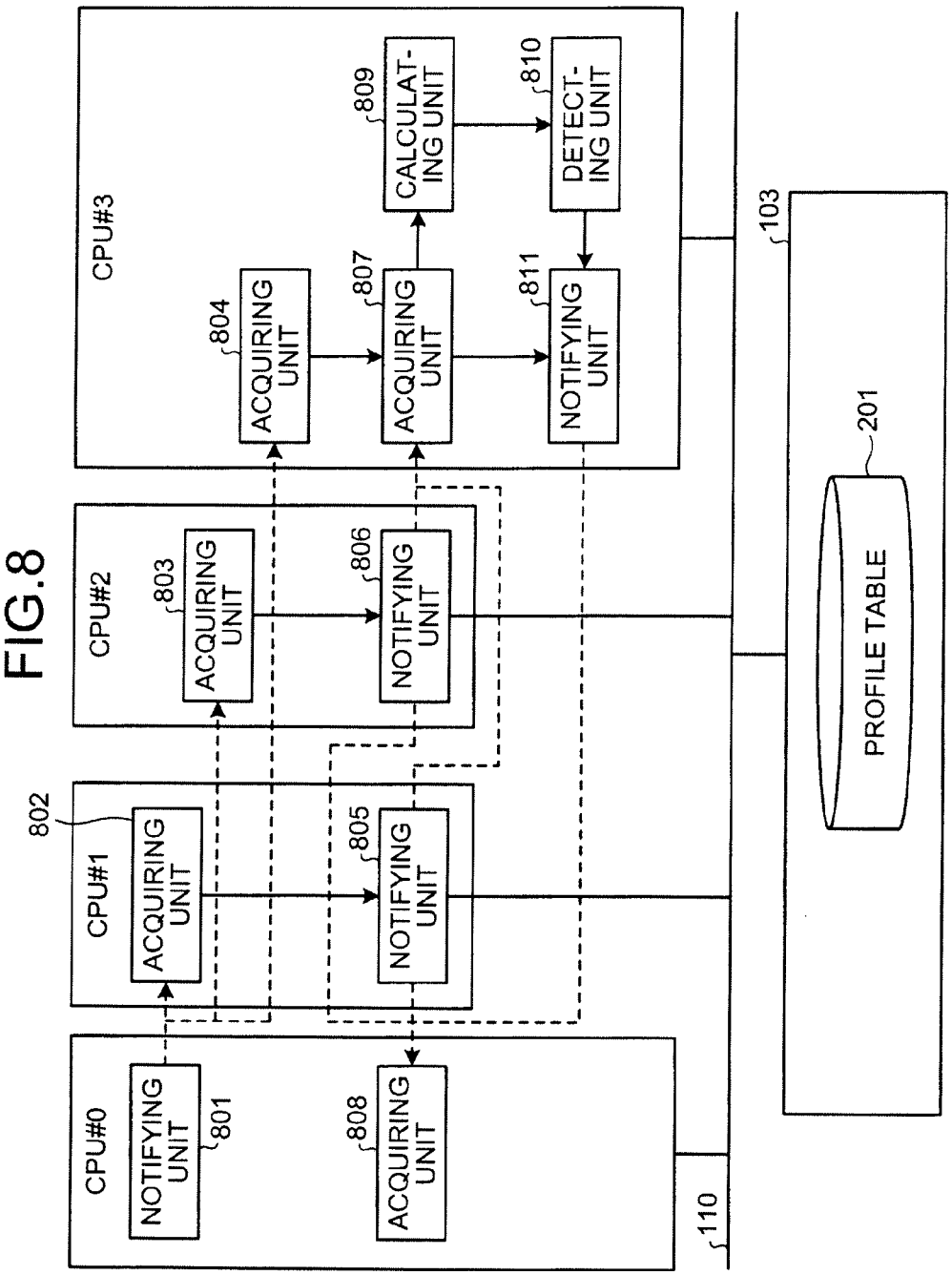
FIG. 8 is a functional diagram of the multicore processor system 100 according to the second embodiment.

Functions of the multicore processor system 100 according to the second embodiment will be described. FIG. 8 is a functional diagram of the multicore processor system 100 according to the second embodiment. The multicore processor system 100 includes a notifying unit 801, an acquiring unit 802, an acquiring unit 803, an acquiring unit 804, a notifying unit 805, a notifying unit 806, an acquiring unit 807, an acquiring unit 808, a calculating unit 809, a detecting unit 810, and a notifying unit 811. The functions (the notifying unit 801 to the notifying unit 811) acting as a control unit are implemented by the CPUs #0 to #3 executing programs stored in storage devices. The storage devices are, for example, the ROM 102, the RAM 103, the flash ROM 104, and the flash ROM 106 depicted in FIG. 1. Alternatively, programs may be executed via the I/F 108 by another CPU to implement the functions.

In FIG. 8, the notifying unit 801 and the acquiring unit 808 are included as functions of the CPU #0; the acquiring unit 802 and the notifying unit 805 are included as functions of the CPU #1; and the acquiring unit 803 and the notifying unit 806 are included as functions of the CPU #2. The acquiring unit 804, the acquiring unit 807, and the calculating unit 809 to the notifying unit 811 are included as functions of the CPU #3.

This is based on the premise that the CPU #0 executes a given process defined as a parent process while the CPU #1, the CPU #2, and the CPU #3 execute a child process 1, a child process 2, and a child process 3, respectively, called from the parent process. It is also assumed that at least one among the child processes 1 and 2 is completed before the parent process and that the child process 3 is completed after the parent process.

For example, if the CPU #1 executes the parent process and the CPU #0 executes a child process, the notifying unit 801 and the acquiring unit 808 may be included as functions of the CPU #1 and the acquiring unit 802 and the notifying unit 805 may be included as functions of the CPU #0. The multicore processor system 100 according to the second embodiment can access the profile table 201. The acquiring unit 808 has a function equivalent to the acquiring unit 207 and will not be described.

The notifying unit 801 has a function of giving notification of an estimated completion period for a process that uses the result of the second process, in addition to the contents of the notification given by the notifying unit 202. For example, the notifying unit 801 causes the CPU #0 executing the parent process to notify the CPU #1 of an execution request for the child process 1, the remaining period A1 from the time of the execution request until the completion of the parent process, and an estimated period B1 for completing a process that uses the result of the child process 1. The contents of the notification may be stored in a register, cache memory, etc. of the CPU #0.

The acquiring units 802 to 804 have a function of acquiring the estimated completion period of a process that uses the result of the second process, in addition to the contents acquired by the acquiring unit 203. For example, the acquiring unit 802 causes the CPU #1 to acquire from the CPU #0, an execution request for the child process 1, the remaining period A1 from the time of the execution request until the completion of the parent process, and the estimated period B1 for completing the process that uses the result of the child process 1. The acquired contents are stored in a register, cache memory, etc. of the CPU #1.

The notifying unit 805 and the notifying unit 806 have a function of notifying another core (different from the first core) of the estimated completion period of a process that uses the result of the second process, in addition to the contents notified by the notifying unit 206. For example, the notifying unit 805 causes the CPU #1 to notify the CPU #0 of the result of the child process 1 and to notify the CPU #2 and the CPU #3 of the estimated period B1 of the process that uses the result of the child process 1. The contents of the notification may be stored in a register, cache memory, etc. of the CPU #1.

The acquiring unit 807 has a function of causing a third core, which is executing a third process, to acquire an estimated completion period of a fourth process that is executed by the first core and uses the result of the second process, when the second core notifies the first core of the result of the second process. For example, the acquiring unit 807 causes the CPU #3, which is executing the child process 3 as the third process, to acquire the estimated period B1 of the process that is executed by the CPU #0 and uses the result of the child process 1.

If multiple second cores exist, when the second cores notify the first core of the results of the second processes, the acquiring unit 807 may cause the third core to acquire the estimated period of the fourth process, which is present for each of the second cores. For example, when the CPU #1 and the CPU #2 notify the CPU #0 of the result of the child process 1 and the result of the child process 2, respectively, the acquiring unit 807 causes the CPU #3 to acquire the estimated period B1 of a process that uses the result of the child process 1 and an estimated period B2 of a process that uses the result of the child process 2. The acquired contents are stored in a register, cache memory, etc. of the CPU #3.

The calculating unit 809 has a function of calculating a waiting period by subtracting from the estimated period of the fourth process, the period that elapses from the point of acquisition of the estimated period of the fourth process by the acquiring unit 807 until the completion of the third process, if the third core completes the third process before the estimated completion period of the fourth process. For example, if the CPU #3 completes the child process 3 before the estimated completion period of the process that uses the result of the child process 1, the calculating unit 809 calculates a waiting period (B1−D3) by subtracting from the estimated period B1 of the process that uses the result of the child process 1, the period (period D3) that elapses until the completion of the child process 3.

If multiple second cores exist, the calculating unit 809 may cause the third core to calculate a waiting period by subtracting, from a total of the estimated periods of the fourth processes, the period that elapses from the point of acquisition of the group of the estimated periods of the fourth processes by the acquiring unit until the completion of the third process. For example, the calculating unit 809 may cause the CPU #3 to calculate a waiting period (B1+B2−D3) by subtracting the elapsed period D3 from a sum B1+B2 of the estimated periods of the processes that use the results of the child process 1 and child process 2. The calculated value is stored in a register, cache memory, etc. of the CPU #3.

The detecting unit 810 causes the third core to detect that the waiting period calculated by the calculating unit 809 has elapsed since the time at the point of calculation by the calculating unit 809. For example, the detecting unit 810 causes the CPU #3 to detect that the waiting period (B1−D3) has elapsed since the calculation of the waiting period of the CPU #3. Information indicative of the detection is stored in a register, cache memory, etc. of the CPU #3.

The notifying unit 811 has a function of giving notification of the result of the third process from the third core to the first core after the estimated completion period of the fourth process, obtained by adding the estimated period of the fourth process to the time at the point of acquisition of the estimated period of the fourth process by the acquiring unit 807. If the detecting unit 810 detects that the waiting period has elapsed, the notifying unit 811 may give notification from the third core to the first core. For example, the notifying unit 811 gives notification of the result of the child process 3 from the CPU #3 to the CPU #0 after the time point obtained by adding the estimated period B1 to the time point of acquisition of the estimated period B1 of the process that uses the result of the child process 1. The contents of the notification may be stored in a register, cache memory, etc. of the CPU #3.

Figure 9:
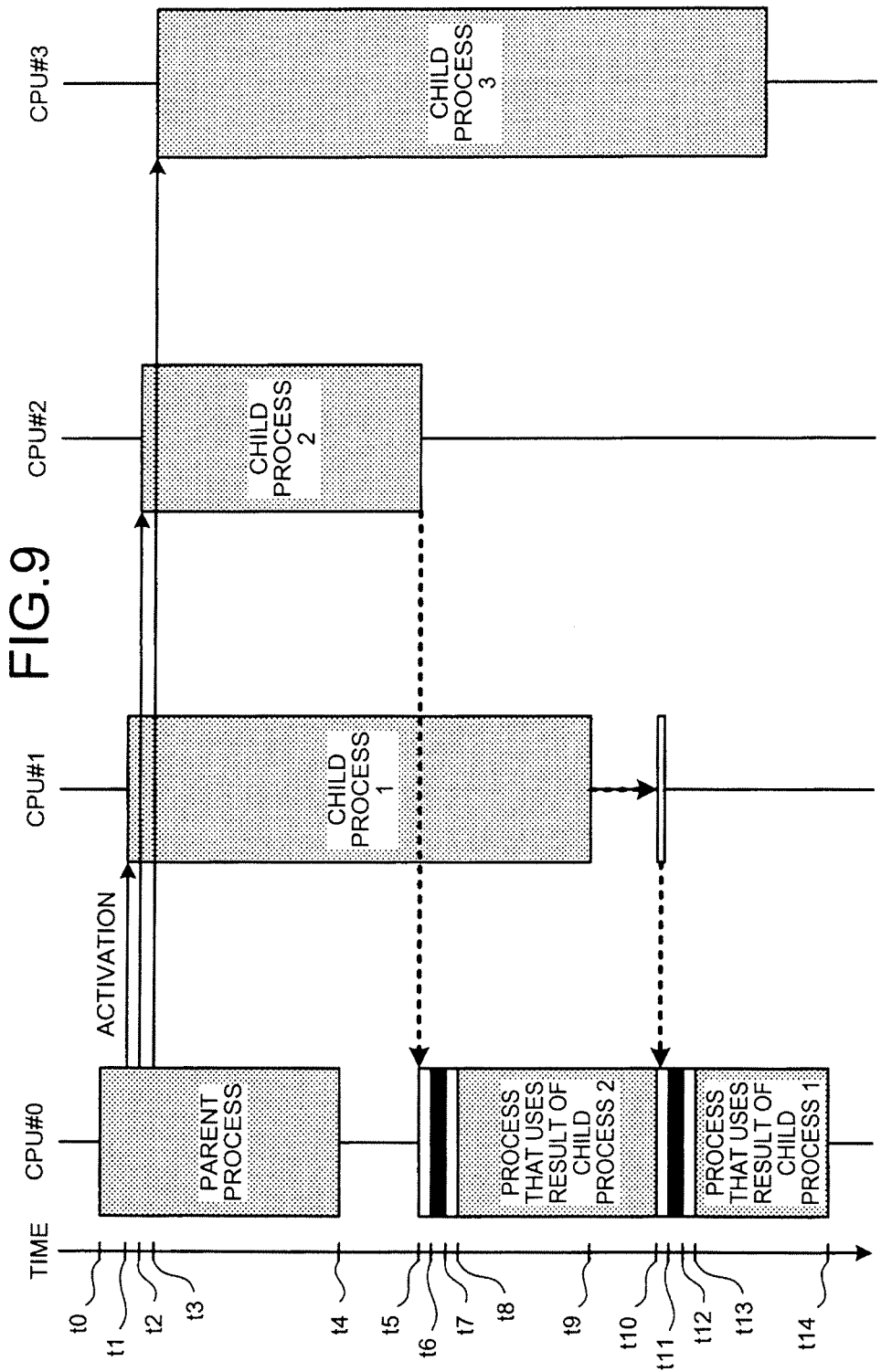
FIG. 9 is an explanatory view of an operation pattern of a process between a parent and child, according to the second embodiment.

FIG. 9 is an explanatory view of an operation pattern of a process between a parent and child, the operation pattern enabling efficient utilization of cache memory according to the second embodiment. In the example depicted in FIG. 9, as is the case with FIG. 3, the CPU #0 executes a parent process at time t0 and the CPUs #1 to #3 execute the child processes 1 to 3 in response to execution requests from the parent process. For example, the CPU #1 executes the child process 1 at time t1; the CPU #2 executes the child process 2 at time t2; and the CPU #3 executes the child process 3 at time t3.

In FIG. 9, it is assumed that the CPUs #1 to #3 complete the processes after time t4 when the parent process starts waiting and that among the CPUs #1 to #3, the CPU #2 completes the process first at time t5. Since the parent process has been completed and the CPU #0 is in the waiting state at time t5, the CPU #2 immediately notifies the CPU #0 of the result of the child process 2.

The CPU #0 executes the interrupt process with respect to the CPU #2 from time t5 to time t6, executes the reception process from time t6 to time t7 to receive the result of the child process 2, and executes the return process from time t7 to time t8. Subsequently, the CPU #0 executes from time t8 to time t10, a process that uses the result of the child process 2.

At time t9, the CPU #1 completes the child process 1. Since the CPU #0 is executing the process that uses the result of the child process 2 at time t9, the CPU #1 waits until time t10 when the CPU #0 completes the process that uses the result of the child process 2, and gives notification of the result of the child process 1 at time t10. The notified CPU #0 executes the interrupt process with respect to the CPU #1 from time t10 to time t11, executes the reception process from time t11 to time t12 to receive the result of the child process 1, and executes the return process from time t12 to time t13. After the return process, the CPU #0 executes from time t13 to time t14, a process that uses the result of the child process 1.

As described, while the CPU #0 is executing from time t8 to time t10, a process that uses the result of a child process, if another child process is completed, the CPU completing the other process waits because the process that uses the result of the child process is still under execution. Thus, the cache contents saving an incomplete state of the process that uses the result of the child process of the CPU #0 can be prevented from being rewritten by the interrupt process and the result of another child process. As is the case with FIG. 3, if the interrupt processes are executed together at the end of the parent process, the number of interrupts can be reduced.

Figure 10:
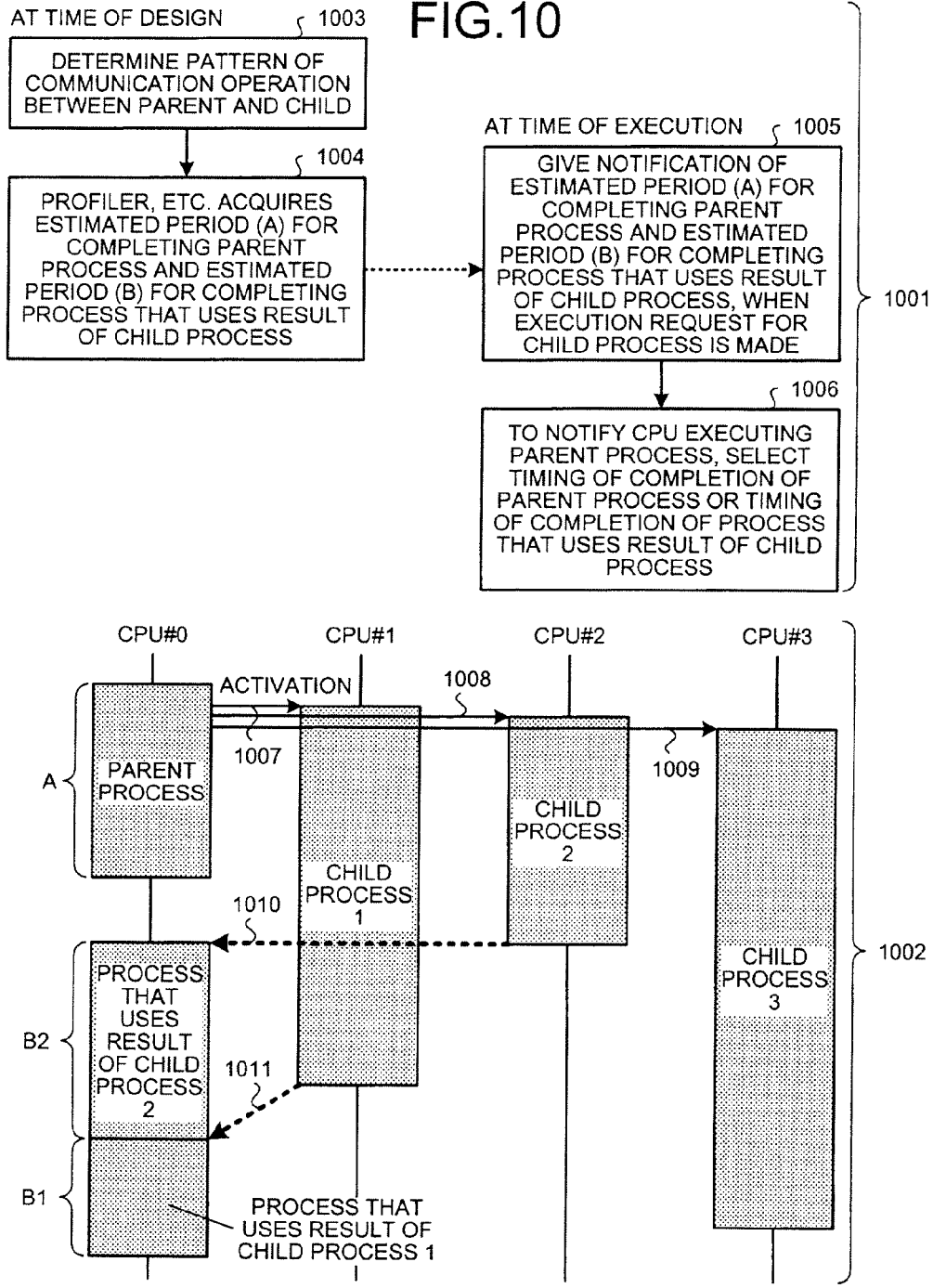
FIG. 10 is an explanatory view of processes executed at the time of design and at the time of execution for controlling the timing of the inter-core communication according to the second embodiment.

FIG. 10 is an explanatory view of processes executed at the time of design and at the time of execution for controlling the timing of the inter-core communication according to the second embodiment. FIG. 10 depicts the processes at the time of design and the operation at the time of execution required for implementing the operation depicted in FIG. 9. A process group denoted by reference numeral 1001 represents processes 1003 to 1006 executed at the time of design and execution, and an explanatory view denoted by reference numeral 1002 represents details of the processes corresponding to the processes 1003 to 1006. The processes executed at the time of design include the process 1003 and the process 1004, and the processes executed at the time of execution include the process 1005 and the process 1006.

In the process 1003, a profiler or a designer determines a pattern of communication operation between the parent and child. For example, if a given process calls a process, the profiler regards the former process as a parent process and the latter process as a child process. In the explanatory view denoted by reference numeral 1002, the profiler regards a process executed by the CPU #0 as the parent process and processes executed by the CPUs #1 to #3 as the child processes 1 to 3. In the process 1004, the profiler acquires an estimated period (A) for completing the parent process and an estimated period (B) for completing a process that uses the result of a child process, based on a result of operation in a simulation, etc.

At the time of execution, in the process 1005, when the CPU executing the parent process makes an execution request for a child process, the CPU executing the child process is notified of the estimated period (A) for completing the parent process and the estimated period (B) for completing the process that uses the result of the child process. In the explanatory view denoted by reference numeral 1002, the CPU #0 notifies the CPU #1 of an execution request for the child process 1, the estimated period (A) for completing the parent process, and an estimated period (B1) for completing a process that uses the result of the child process 1 through a notification 1007. Similarly, the CPU #0 notifies the CPU #2 of an execution request for the child process 2, the period (A), and a period (B2) through a notification 1008, and the CPU #0 notifies the CPU #3 of an execution request for the child process 3, the period (A), and a period (B3) through a notification 1009.

Subsequently, in the process 1006, a CPU executing a child process selects the timing of the completion of the parent process or of the completion of the process that uses the result of a child process to notify the CPU executing the parent process of a result of the child process. In the explanatory view denoted by reference numeral 1002, the CPU #2 notifies the CPU #0 of the result of the child process 2 through a notification 1008 at the timing when the CPU #0 completes the parent process. The CPU #1 notifies the CPU #0 of the result of the child process 1 through a notification 1011 at the timing when the CPU #0 completes the process that uses the result of the child process 2.

Figure 11:
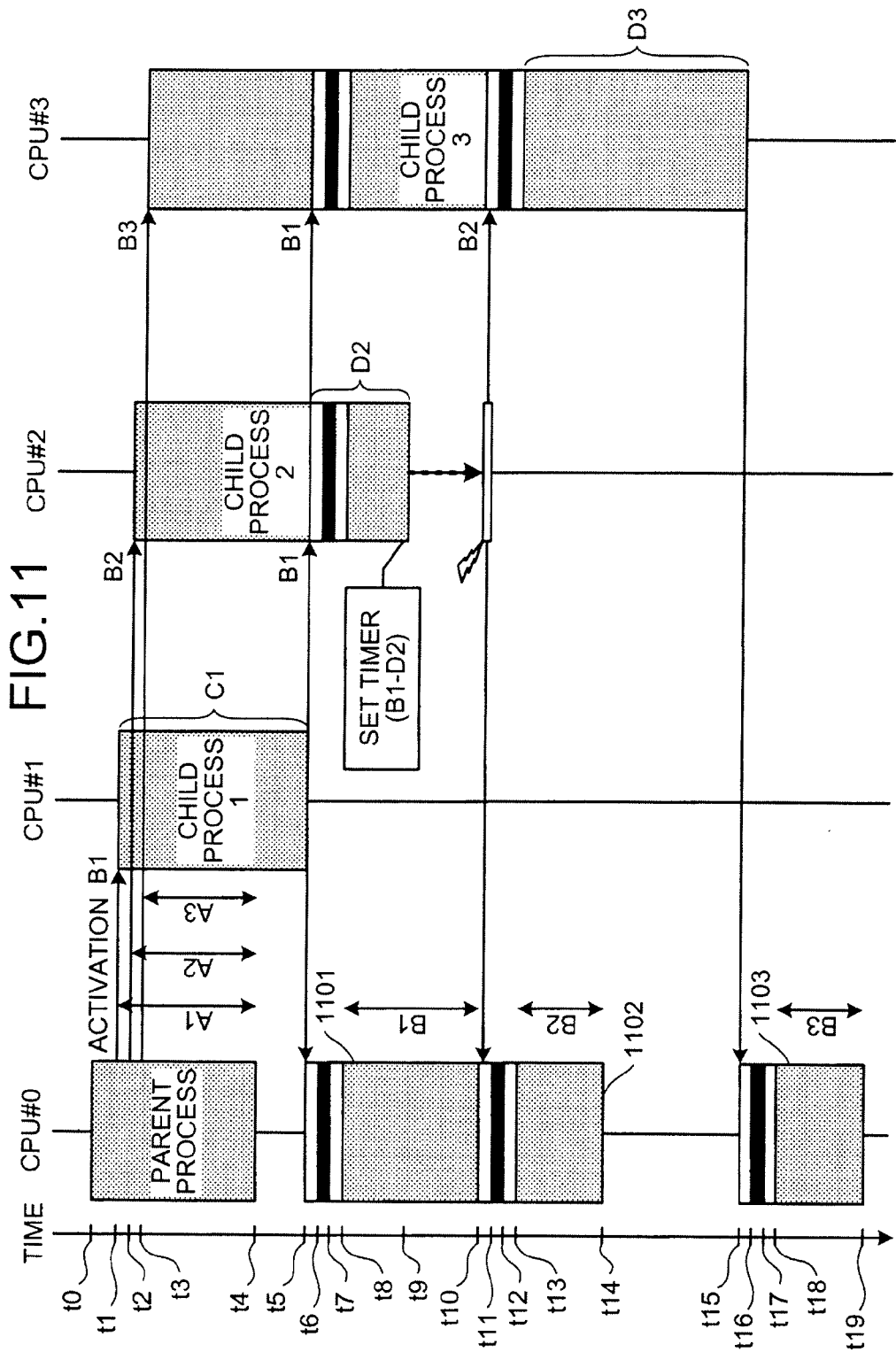
FIG. 11 is an explanatory view of an execution example 1 of a process between a parent and child when the timing of the inter-core communication is controlled according to the second embodiment.

FIG. 11 is an explanatory view of an execution example 1 of a process between a parent and child when the timing of the inter-core communication is controlled according to the second embodiment. FIG. 11 depicts a first execution example of a process between a parent and child when the timing of the inter-core communication is controlled by the processes executed at the time of design, depicted in FIG. 10. At time t0, the CPU #0 activates the parent process and at time t1, the CPU #0 notifies the CPU #1 of an execution request for the child process 1 to the CPU #1, the remaining period A1 from time t1 until the estimated time t4 when the parent process is completed, and the estimated completion period B1 of a process 1101 that uses the result of the child process 1.

Subsequently, at time t2, the CPU #0 notifies the CPU #2 of an execution request for the child process 2 to the CPU #2, the remaining period A2 from time t2 until the estimated time t4 when the parent process is completed, and the estimated completion period B2 of a process 1102 that uses the result of the child process 2. Subsequently, at time t3, the CPU #0 notifies the CPU #3 of an execution request for the child process 3 to the CPU #3, the remaining period A3 from time t3 until the estimated time t4 when the parent process is completed, and an estimated completion period B3 of a process 1103 that uses the result of the child process 3.

At time t4, the CPU #0 completes the parent process. Since no notification is received from the CPUs #1 to #3 at the point of time t4, the CPU #0 waits until notification is received. At time t5, the CPU #1 completes the child process 1. Since at time t5, the remaining period A1 is less than or equal to the period C1 (period consumed for the child process 1) and the parent process is completed, the CPU #1 immediately notifies the CPU #0 of the result of the child process 1. The CPU #1 notifies the CPUs #2 and #3 executing the other child processes of the estimated completion period B1 of the process that uses the result of the child process 1.

The notified CPU #0 executes the interrupt process with respect to the CPU #1 from time t5 to time t6, executes the reception process from time t6 to time t7 to receive the result of the child process 1, and executes the return process from time t7 to time t8. The CPU #0 receiving the notification from the CPU #1 executes from time t8 to time t10, the process 1101 that uses the result of the child process 1.

The notified CPUs #2 and #3 execute the interrupt process with respect to the CPU #1 from time t5 to time t6, execute the reception process from time t6 to time t7 to receive the period B1, and execute the return process from time t7 to time t8. After the return, the CPU #2 continues the child process 2 and the CPU #3 continues the child process 3.

At time t9, the CPU #2 completes the child process 2. At time t9, the estimated completion period B1 of the process 1101 that uses the result of the child process 1 is greater than a period D2 (period consumed from time t5 when the period B1 is acquired until the completion of the child process 2) and the CPU #0 has not yet completed the process 1101 that uses the result of the child process 1. Therefore, the CPU #2 calculates a waiting period B1−D2 by subtracting D2 from B1 and sets the waiting period B1−D2 in the timer. After the setting, the CPU #2 sets the thread in the sleep state until the timer expires.

When the timer of the CPU #2 expires at time 10, the CPU #2 recovers the thread from the sleep state and notifies the CPU #0 of the result of the child process 2. The CPU #2 notifies the CPUs #1 and #3 executing the other child processes of the estimated completion period B2 of the process 1102 that uses the result of the child process 2.

The notified CPU #0 executes the interrupt process with respect to the CPU #2 from time t10 to time t11, executes the reception process from time t11 to time t12 to receive the result of the child process 2, and executes the return process from time t12 to time t13. After the return, the CPU #0 executes from time t13 to time t14, the process that uses the result of the child process 2.

The notified CPU #3 executes the interrupt process with respect to the CPU #2 from time t10 to time t11, executes the reception process from time t11 to time t12 to receive the period B2, and executes the return process from time t12 to time t13. After the return, the CPU #3 continues the child process 3. Although the CPU #1 also receives the notification, the notification is discarded since the child process 1 is completed and no process is under execution.

At time t14, the CPU #0 completes the process 1102 that uses the result of the child process 2. Since the CPU #0 has not yet acquired the result of the child process 3 at the point of time t14, the CPU #0 waits until the result of the child process 3 is acquired.

At time t15, the CPU #3 completes the child process 3. At time t15, the estimated period B2 of the process 1102 that uses the result of the child process 2 is less than or equal to the period D3 (period elapsing from time t10 when the period B2 is acquired until the completion of the child process 3) and the CPU #0 has completed the process 1102 that uses the result of the child process 2. Therefore, the CPU #3 immediately notifies the CPU #0 of the result of the child process 3. The CPU #3 notifies the CPUs #1 and #2 executing the other child processes of the estimated completion period B3 of the process that uses the result of the child process 3.

The notified CPU #0 executes the interrupt process with respect to the CPU #3 from time t15 to time t16, executes the reception process from time t16 to time t17 to receive the result of the child process 3, and executes the return process from time t17 to time t18. After the return process, the CPU #0 executes from time t18 to time t19, the process 1103 that uses the result of the child process 3. Although the CPUs #1 and #2 also receive the notification, the notification is discarded since both the child processes 1 and 2 are completed and no process is under execution.

Figure 12:
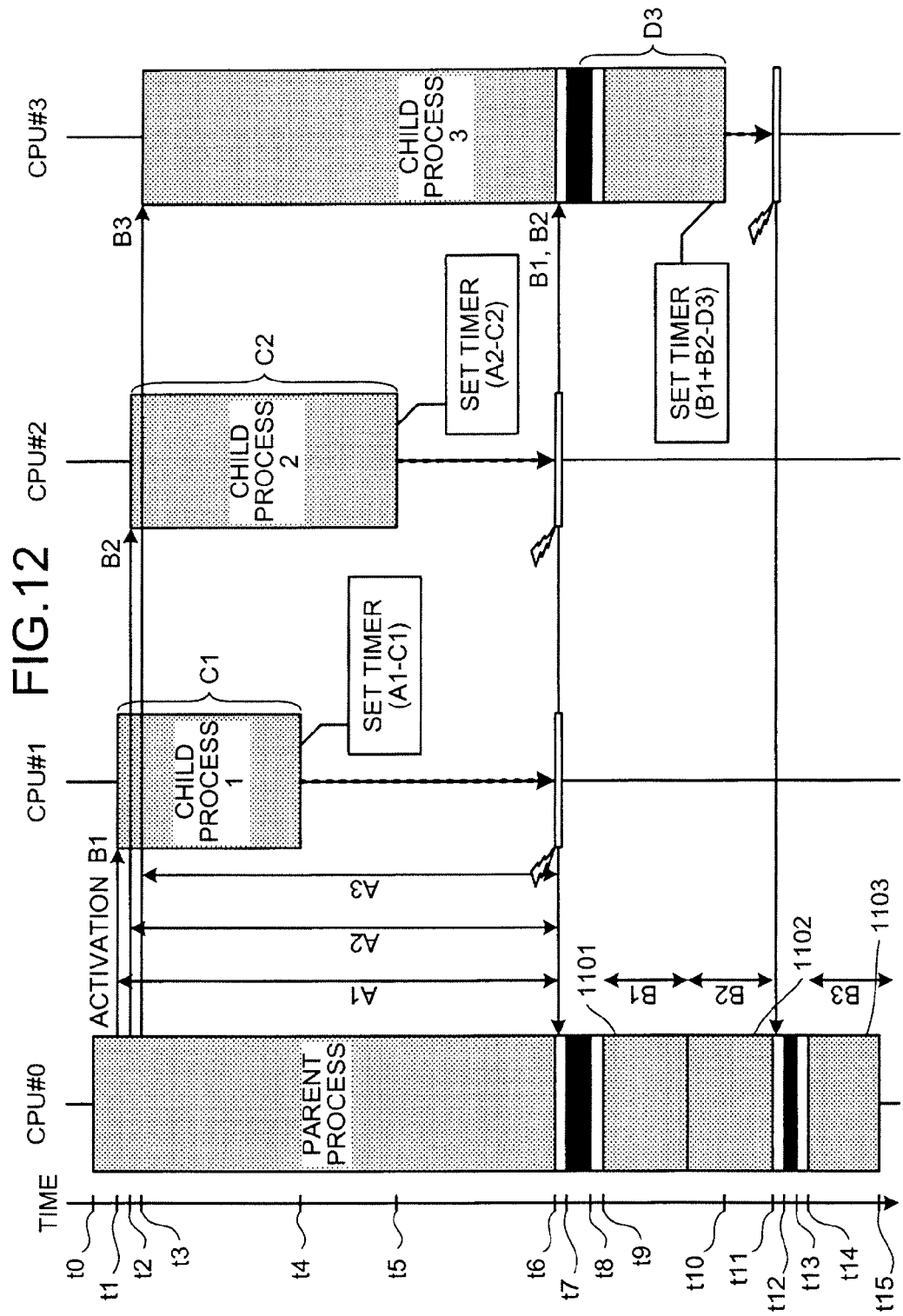
FIG. 12 is an explanatory view of an execution example 2 of a process between a parent and child when the timing of the inter-core communication is controlled according to the second embodiment.

FIG. 12 is an explanatory view of an execution example 2 of a process between a parent and child when the timing of the inter-core communication is controlled according to the second embodiment. FIG. 12 depicts a second execution example of a process between parent and child when the timing of the inter-core communication is controlled by executing the processes at the time of design in FIG. 10. A difference from the execution example 1 depicted in FIG. 11 is in that multiple child processes are completed before the parent process is completed.

At time t0, the CPU #0 activates the parent process and at time t1, the CPU #0 notifies the CPU #1 of an execution request for the child process 1 to the CPU #1, a remaining period A1 from time t1 until estimated time t6 when the parent process is completed, and an estimated period B1 of the process 1101 that uses the result of the child process 1.

Subsequently, at time t2, the CPU #0 notifies the CPU #2 of an execution request for the child process 2 to the CPU #2, a remaining period A2 from time t2 until the estimated time t6 when the parent process is completed, and an estimated period B2 of the process 1102 that uses the result of the child process 2. Subsequently, at time t3, the CPU #0 notifies the CPU #3 of an execution request for the child process 3 to the CPU #3, a remaining period A3 from time t3 until the estimated time t6 when the parent process is completed, and an estimated period B3 of the process 1103 that uses the result of the child process 3.

At time t4, the CPU #1 completes the child process 1. Since at time t4, the remaining period A1 is greater than the period C1 (period consumed for the child process 1) and the parent process is not yet completed, the CPU #1 calculates a waiting period A1−C1 by subtracting C1 from A1 and sets the waiting period A1−C1 in the timer. After the setting, the CPU #1 sets the thread in the sleep state until the timer expires.

At time t5, the CPU #2 completes the child process 2. Since at time t5, the remaining period A2 is greater than the period C2 (period consumed for the child process 2) and the parent process is not yet completed, the CPU #2 calculates the waiting period A2−C2 by subtracting C2 from A2 and sets the waiting period A2−C2 in the timer. After the setting, the CPU #2 sets the thread in the sleep state until the timer expires.

When the timers of the CPUs #1 and #2 expire at time 6, the CPUs #1 and #2 recover the threads from the sleep state and notify the CPU #0 executing the parent process of a result of the child process 1 and a result of the child process 2, respectively. The CPU #1 notifies the CPUs #2 and #3 executing the other child processes of the estimated period B1 of the process 1101 that uses the result of the child process 1. Similarly, the CPU #2 notifies the CPUs #1 and #3 executing the other child processes of the estimated period B2 of the process 1102 that uses the result of the child process 2.

The notified CPU #0 executes together the interrupt processes with respect to the CPU #1 and the CPU #2 from time t6 to time t7, executes the reception processes from time t7 to time t8 to receive the results of the child process 1 and the child process 2, and executes the return process from time t8 to time t9. After the return process, the CPU #0 sequentially executes from time t9 to time t11, the process 1101 that uses the result of the child process 1 and the process 1102 that uses the result of the child process 2. Although the CPUs #1 and #2 also receive the notification, the notification is discarded since both the child processes 1 and 2 are completed and no process is under execution.

The notified CPU #3 executes together the interrupt processes with respect to the CPU #1 and the CPU #2 from time t6 to time t7. Subsequently, the CPU #3 executes the reception processes from time t7 to time t8 to receive the estimated period B1 of the process 1101 that uses the result of the child process 1 and the estimated period B2 of the process 1102 that uses the result of the child process 2, and executes the return process from time t8 to time t9. After the return process, the CPU #3 continues the child process 3 from time t9 to time t10.

At time t10, the CPU #3 completes the child process 3. At time t10, the estimated period B1 of the process 1101 that uses the result of the child process 1+the estimated period B2 of the process 1102 that uses the result of the child process 2 is greater than a period D3 (period from time t6 when the period B1 and the period B2 are acquired until the completion of the child process 3). According to the relationship of this inequality expression, the CPU #0 has not yet completed the process 1101 that uses the result of the child process 1 nor the process 1102 that uses the result of the child process 2. Therefore, the CPU #3 calculates a waiting period B1+B2−D3 by subtracting D3 from B1+B2 and sets the waiting period B1+B2−D3 in the timer. After the setting, the CPU #3 sets the thread in the sleep state until the timer expires.

When the timer of the CPU #3 expires at time 11, the CPU #3 recovers the thread from the sleep state and notifies the CPU #0 of a result of the child process 3. The CPU #3 notifies the CPUs #1 and #2 executing the other child processes of the estimated period B3 of the process 1103 that uses the result of the child process 3.

The notified CPU #0 executes the interrupt process with respect to the CPU #3 from time t11 to time t12, executes the reception process from time t12 to time t13 to receive the result of the child process 3, and executes the return process from time t13 to time t14. After the return process, the CPU #0 executes from time t14 to time t15, the process that uses the result of the child process 3. Although the CPUs #1 and #2 also receive the notification, the notification is discarded since both the child processes 1 and 2 are completed and no process is under execution.

Figure 13:
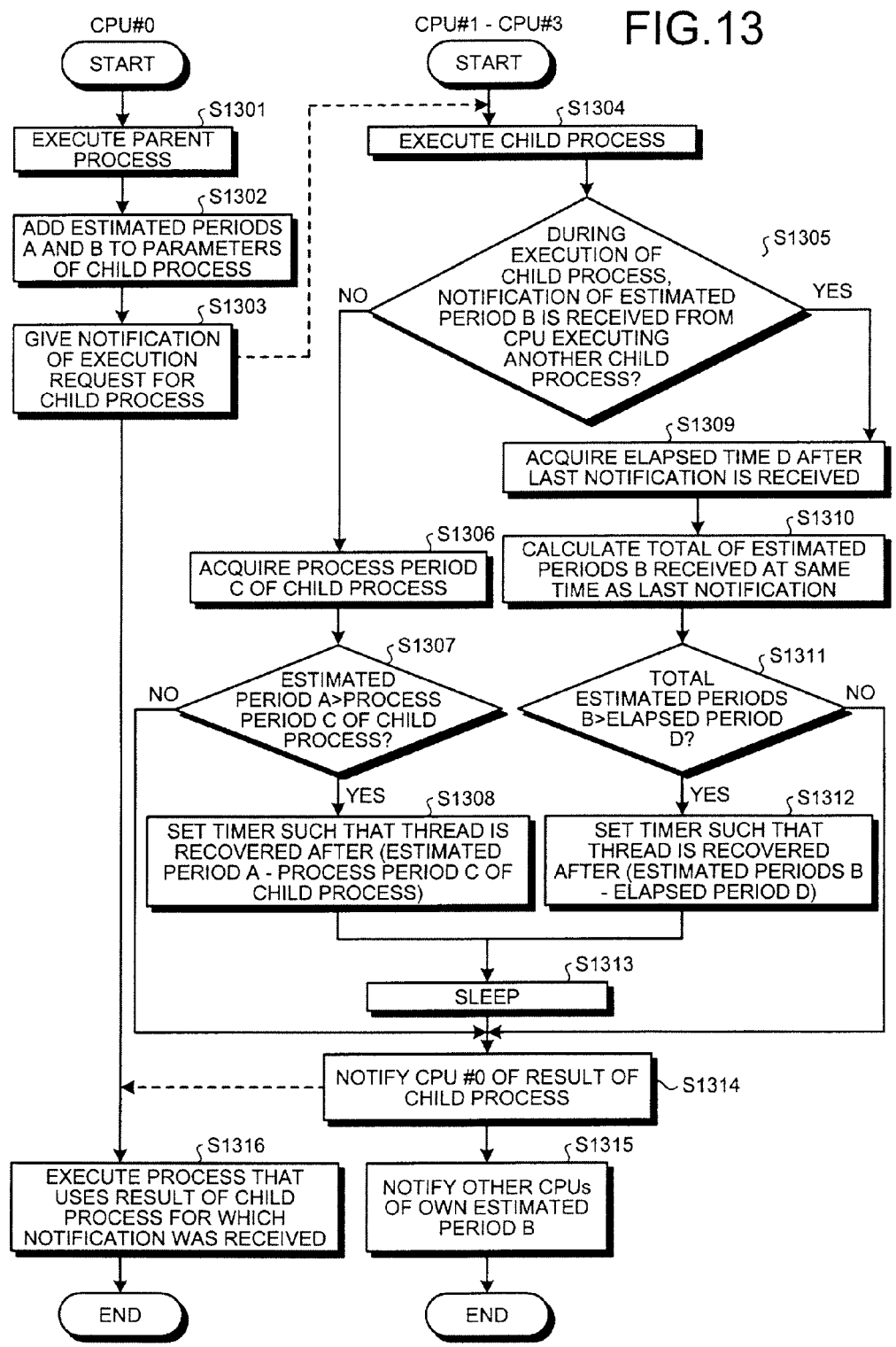
FIG. 13 is a flowchart of a process between a parent and child when the timing of inter-core communication is controlled according to the second embodiment.

FIG. 13 is a flowchart of a process between a parent and child when the timing of inter-core communication is controlled according to the second embodiment. In the process between parent and child depicted in FIG. 13, the CPU #0 executes a parent process and the CPUs #1 to #3 execute child processes. For simplicity of description, it is assumed that the CPU #1 executes a child process in this description.

The CPU #0 executes the parent process (step S1301). When a process calling a child process occurs during the execution of the parent process, the CPU #0 adds an estimated period A of the parent process and an estimated period B of the process that uses the result of the child process to the parameters of the child process (step S1302). After the addition, the CPU #0 notifies the CPU #1 of an execution request for the child process (step S1303).

The CPU #1 acquires the execution request for the child process and executes the child process (step S1304). After the completion of the child process, the CPU #1 determines whether during execution of the child process, notification of an estimated period B was received from a CPU executing another child process (step S1305). The CPU executing another child process is the CPU #2 or the CPU #3 in this embodiment.

If a notification of the estimated period B is not received from a CPU executing another child process (step S1305: NO), the CPU #1 acquires a process period C of the child process (step S1306). After the acquisition, the CPU #1 determines whether the estimated period A added to the parameters is greater than the process period C of the child process (step S1307). If the estimated period A is greater than the process period C of the child process (step S1307: YES), the CPU #1 sets the timer such that the thread is recovered after (the estimated period A−the process period C of the child process) (step S1308) and sets the thread in the sleep state (step S1313).

After the recovery from the sleep state consequent to the process of step S1313 or if the estimated period A is less than or equal to the process period C of the child process (step S1307: NO), the CPU #1 notifies the CPU #0 of a result of the child process (step S1314). After the notification of the result of the child process, the CPU #1 notifies the other CPUs except the CPU #0 of the estimated period B of the CPU #1 (step S1315) and is terminated. The CPU #0 notified at step S1314 executes a process that uses the result of the child process for the notification is received (step S1316) and completes the process.

If a notification of the estimated period B was received from a CPU executing another child process (step S1305: YES), the CPU #1 acquires an elapsed time D after the last notification is received (S1309). After the acquisition, the CPU #1 calculates a total of the estimated periods B received at the same time as the last notification (step S1310).

The communications from CPUs completing the child processes may be somewhat shifted from each other and may not exactly be at the same time. However, actually, the CPUs execute the reception process after executing the interrupt process when an interrupt occurs due to the communication and therefore, a shift of communication can be absorbed by interrupt overhead if all the processors are physically located within a short distance such as being housed on one chip. As a result, if the notifications are made in a somewhat shifted manner, each CPU can collectively execute the reception processes.

After calculating the total, the CPU #1 determines whether the total of the estimated periods B is greater than the elapsed period D (step S1311). If the total of the estimated periods B is greater than the elapsed period D (step S1311: YES), the CPU #1 sets the timer such that the thread is recovered after (the estimated periods B–the elapsed period D) (step S1312) and goes to the process of step S1313. If the total of the estimated periods B is less than or equal to the elapsed period D (step S1311: NO), the CPU #1 goes to the process of step S1314.

As described, according to the multicore processor system, the communication control method, and the communication control program, a third core other than first and second cores, and executing a third process acquires an estimated period for completing a fourth process that uses the result of a second process. The third core notifies the first core of the result of the third process after the estimated period for completing the fourth process. As a result, it is not necessary to rewrite cache memory even if the first core is executing a process that uses the result of another process and processing efficiency in the multicore processor system can be improved.

In the multicore processor system, if the third process is completed before the estimated time of completion of the fourth process, the first core may be notified of the result of the third process when it is detected that the estimated time of completion of the fourth process has passed. As a result, even if the first core is executing a process that uses the result of another process, the contents of the cache memory of the first core are not rewritten and changed to contents of another process and processing efficiency in the multicore processor system can be improved. By detecting that the estimated time of completion of the fourth process has passed, an idle period is not generated in the first core and the processing efficiency can be improved.

If multiple second cores complete the second processes before the estimated time of completion of the third process, the first core may be notified of a result of the third process after the estimated completion time of a fourth process group in the multicore processor system. As a result, even if the first core is executing the fourth process group, the contents of the cache memory of the first core are not rewritten and changed to contents of another process and processing efficiency in the multicore processor system can be improved. This is particularly effective when the number of cores increases and the processes that use the results of child processes increase.

In the multicore processor system, if the third process is completed before the estimated time of completion of the fourth process group, the first core may be notified of the result of the third process when it is detected that the estimated time of completion of the fourth process group has passed. As a result, even if the first core is executing the fourth process, the contents of the cache memory of the first core are not rewritten and changed to contents of another process, whereby processing efficiency in the multicore processor system can be improved. By detecting that the estimated time of completion of the fourth process group has passed, an idle period is not generated in the first core and processing efficiency can be improved.

The first embodiment and the second embodiment can be mixed and operated in the multicore processor system. When the first core notifies the second core of an execution request for the second process, the second core can determine whether the acquired process is that of the first embodiment or the second embodiment depending on whether an estimated period of the fourth process that uses the result of the second process is added to parameters.

The communication control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The multicore processor system, the communication control method, and the communication control program prevent the core executing the parent process from being interrupted in the middle of processing, thereby preventing the cache memory from being needlessly rewritten, and enabling improved processing efficiency.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multicore processor system comprising a plurality of cores,
   wherein at least a first core of the plurality of core is configured to:
   acquire from a second core of the plurality of cores, the second core being separate from the at least the first core and being configured to execute a first process, an execution request for a second process and a remaining period from a time of execution of the execution request until an estimated time of completion of the first process;
   give a notification of a result of the second process to the second core after an estimated completion time of the first process, obtained by adding the remaining period to an acquired start time of the second process;

calculate a waiting period by subtracting a period consumed for completing the second process from the remaining period, when the at least the first core completes the second process before the estimated completion time of the first process; and cause the at least the first core to detect that the waiting period has elapsed since calculating the waiting period, wherein the multicore processor system is configured to give a notification of the result of the second process from the at least the first core to the second core, when the at least the first core detects that the waiting period has elapsed.

2. The multicore processor system according to claim 1, wherein the multicore processor system is further configured to:

cause a third core, which is executing a third process, to acquire an estimated period for completing a fourth process that is executed by the second core and uses the result of the second process, when the first core notifies the second core of the result of the second process, and give a notification of a result of the third process from the third core to the second core, after an estimated completion time of the fourth process, acquired by adding the estimated period of the fourth process to the time of acquisition of the estimated period of the fourth process.

3. The multicore processor system according to claim 2, wherein the multicore processor system is further configured to:

calculate a waiting period by subtracting from the estimated period of the fourth process, an elapsed period from the time of acquisition of the estimated period of the fourth process until completion of the third process, when the third core completes the third process before the estimated completion time of the fourth process, cause the third core to detect that the waiting period has elapsed since the calculation of the waiting period, and cause the third core to notify the first core of a result of the third process upon detecting that the waiting period has elapsed.

4. The multicore processor system according to claim 2, wherein the multicore processor system is further configured to:

when a plurality of the at least the first core includes a plurality of first cores, cause the third core to acquire the estimated period of the fourth process present for each of the plurality of first cores when the plurality of first cores notifies the second core of results of the second processes, and give a notification of the result of the third process from the third core to the second core after the estimated completion time of the fourth process, acquired by adding a sum of the estimated periods of the fourth processes to the time of acquisition of the estimated periods of the fourth processes.

5. The multicore processor system according to claim 4, wherein the multicore processor system is further configured to:

calculate a waiting period by subtracting from the total of the estimated periods of the fourth processes, an elapsed period from the time of acquisition of the estimated periods of the fourth processes until completion of the third process, when the third core completes the third process before the estimated completion time of the fourth processes, cause the third core to detect that the waiting period has elapsed since the calculation of the waiting period, and give a notification of the result of the third process from the third core to the first core, when the waiting period is detected to have elapsed.

6. A communication control method executed by a first core of a plurality of cores, the communication control method comprising:

acquiring from a second core of the plurality of cores, the second core being configured to execute a first process, an execution request for a second process and a remaining period from a time of execution of the execution request until an estimated time of completion of the first process;

giving a notification of a result of the second process to the second core after an estimated completion time of the first process, obtained by adding the remaining period to an acquired start time of the second process;

calculating a waiting period by subtracting a period consumed for completing the second process from the remaining period, when the first core completes the second process before the estimated completion time of the first process;

causing the first core to detect that the waiting period has elapsed since calculating the waiting period; and giving a notification of the result of the second process from the first core to the second core, when the first core detects that the waiting period has elapsed.

7. A non-transitory computer-readable recording medium storing a program that causes a first core of a plurality of cores to execute a communication control process comprising:

acquiring from a second core of the plurality of cores, the second core executing a first process, an execution request for a second process and a remaining period from a time of execution of the execution request until an estimated time of completion of the first process; and giving a notification of a result of the second process to the second core after an estimated completion time of the first process, obtained by adding the remaining period to an acquired start time of the second process;

calculating a waiting period by subtracting a period consumed for completing the second process from the remaining period, when the first core completes the second process before the estimated completion time of the first process;

causing the first core to detect that the waiting period has elapsed since calculating the waiting period; and giving a notification of the result of the second process from the first core to the second core, when the first core detects that the waiting period has elapsed.

* * * * *